United States Patent [19]

Keen

[11] 4,324,835
[45] Apr. 13, 1982

[54] CELLULAR INTUMESCENT MATERIALS

[75] Inventor: Christopher V. Keen, Burntwood, England

[73] Assignee: Dunlop Limited, London, England

[21] Appl. No.: 143,522

[22] Filed: Apr. 24, 1980

[30] Foreign Application Priority Data

Jun. 5, 1979 [GB] United Kingdom ............... 19521/79

[51] Int. Cl.³ .......................... B32B 3/02; B32B 5/20; B32B 7/02
[52] U.S. Cl. ..................................... 521/54; 428/921; 428/305.5; 428/308.4
[58] Field of Search ...................... 521/53, 54, 55, 906, 521/907; 428/311, 913, 921, 310, 315; 252/606

[56] References Cited

U.S. PATENT DOCUMENTS

| | | | |
|---|---|---|---|
| 3,312,565 | 4/1967 | Rayner et al. | 428/921 |
| 3,320,087 | 5/1967 | Erickson | 428/921 |
| 3,663,463 | 5/1972 | Wren | 428/921 |
| 3,843,526 | 10/1974 | Roth et al. | 428/921 |
| 3,914,513 | 10/1975 | Brown et al. | 428/921 |
| 3,934,066 | 1/1976 | Murch | 428/315 |
| 4,224,374 | 9/1980 | Priest | 428/311 |

FOREIGN PATENT DOCUMENTS

| | | |
|---|---|---|
| 1206993 | 9/1970 | United Kingdom . |
| 1302094 | 1/1973 | United Kingdom . |
| 1359734 | 7/1974 | United Kingdom . |
| 1463069 | 2/1976 | United Kingdom ................ 428/921 |
| 1499168 | 1/1978 | United Kingdom ................ 428/311 |
| 1519795 | 8/1978 | United Kingdom ................ 428/311 |

Primary Examiner—William J. Van Balen
Attorney, Agent, or Firm—Stevens, Davis, Miller & Mosher

[57] ABSTRACT

A cellular intumescent material comprising a substantially open-called substrate impregnated with a flexible intumescent polymer. The open-celled nature of the substrate is retained. The substrate may be a latex or urethane-based foam, a natural rubber or a synthetic rubber. The impregnant comprises at least a binder (A) and an intumescent component (B).

The binder (A) can be a polyester, a liquid polymer system, a resin, a latex or an elastomer solution.

The intumescent component (B) consists of a carbonific element (e.g. starch, sugar, sorbitol or pentaerythritol, or a compound which can polymerize to a "ladder" structure) and a spumific element (e.g. an inorganic acid or a precursor therefor).

On exposure to a flame the materials flame initially but form a protective char and subsequently extinguish. The char prevents further burning of the treated material.

13 Claims, No Drawings

CELLULAR INTUMESCENT MATERIALS

This invention relates to cellular, intumescent materials and especially to materials which are substantially open-celled and which have been partially or wholly impregnated with a flexible, intumescent polymeric material.

U.K. Patent Specification No. 1,463,069 describes the production of an intumescent polyester-based urethane foam by incorporating an intumescent additive into the foamforming reaction mixture.

U.K. Patent Specification No. 1,519,795 describes the impregnation of an already-produced polyether-based urethane foam with a suspension or dispersion of a particular flame-retardant material.

Attempts to make an intumescent polyether-based urethane foam according to Specification No. 1,463,069 have not proved successful; it is believed that this lack of success is due, in part, to the fact that polyetherurethane molecules are less oxidised than polyesterurethane molecules, so that the former are much more liable to rupture than the latter on exposure to heat and/or fire.

If recourse is had to the method described in Specification No. 1,519,795, care must be taken to keep the amount of particulate material deposited within fairly close limits if the physical properties of the foam (e g compression set, resilience and flex-fatigue) are not to be unduly affected.

It has now been found that a normally-flammable, substantially open-celled, cellular material can be post-treated with an intumescent material so that the open-celled nature is essentially retained and that the treated material will intumesce and char in a fire situation.

Accordingly, the present invention provides a cellular, intumescent material consisting essentially of an open-celled substrate which has been at least partially impregnated with a flexible, intumescent polymeric material, whereby the open-celled nature of the material is retained and the said material will intumesce and char on exposure to a flame.

The cellular material may be a polyether-based urethane foam, a latex foam, a natural or a synthetic rubber, polybutadiene or a styrene/butadiene rubber. Impregnation of the cellular material may be performed by dipping, spraying or application from a dispenser followed by passing the material through the nip of a pair of rollers.

The flexible, intumescent polymeric material must comprise at least the following ingredients:

| A: | A Binder |
|---|---|
| | The binder may be |
| | EITHER a polyester |
| | OR a liquid polymer system |
| | (e g butadiene, a styrene/butadiene copolymer or an acrylonitrile/butadiene copolymer). |
| | OR a resin |
| | (e g phenolic, urea/formaldehyde, pvc, alkyd, polyamide) |
| | OR a latex |
| | (e g neoprene, styrene/butadiene rubber, polyvinyl acetate, polyvinyl chloride or polyacrylonitrile). |
| | OR a solution of a thermoplastic elastomeric material. |

The binder may contain one or more cross-linking agents.

| B: | An Intumescent Component |
|---|---|
| | This component consists of |
| (i) | A carbonific element to ensure the presence of a char, this element being |
| | EITHER a polyhydric material of high carbon content (e g starch, sugars, sorbitol or pentaerythritol). |
| | OR an aromatic compound which can polymerise to a "ladder" structure (e g ortho- and para-nitroanilines) |
| | together with |
| (ii) | A spumific element which causes the char to foam, this element being an inorganic acid or a compound which, on decomposition, will yield an inorganic acid (e g boric, phosphoric or sulphuric acids, generators of inorganic acids, e g mono- and di-ammonium phosphates, ammonium polyphosphates, ammonium halides, the phosphates of melamine and urea and para-nitroaniline bisulphate). |
| | The following further ingredients may be incorporated into the flexible, intumescent polymeric material as required: |
| C: | A Catalyst for the reaction of the polyhydric material/aromatic compound B(i) and the acid or acid generator B(ii). The catalyst may be an amine, an amide, urea, or melamine. |
| D: | A Catalyst for the urethane-forming reaction (e g dibutyl tin dilaurate, stannous octoate, tertiary amines). |
| E: | A filler for use in conjuction with the binder A (e g glass or asbestos fibres, mica flakes) |
| F: | A blowing Agent |
| | A compound which will evolve a non-flammable gas under the conditions of the reaction, e g urea, melamine and chlorinated paraffins. The gas can be ammonia, carbon dioxide or hydrogen chloride. Water can also be evolved during the reaction. |
| G: | A Solvent for use when the flexible intumescent polymeric material is to be applied by spraying (e g ethyl acetate) |
| H: | A Char-reinforcing Aid (e g up to 10 pph binder of an epoxy-, urea/formaldehyde, or phenol/formaldehyde resin) |
| I: | A Pigment to indicate depth of impregnation and/or for aesthetic reasons. |

It is believed that an intumescent cellular material obtained according to the present invention is formed by the following reaction mechanism.

(a) the polyhydric material and the acid/acid generator react to form an ester. This step may be assisted by the use of Catalyst C (above);

(b) the ester dehydrates, leaving a carbon-rich substrate;

(c) gases evolved (with, if present, the assistance of Blowing Agent F) cause the carbon-rich substrate to foam.

During events (a) and (b) above, the reaction mixture melts. The release of gas, either as water from the dehydration stage or from the blowing agent, causes the melt to puff and foam. Finally, the molten mass solidifies to give a foamed carbonaceous char which forms a heat-insulative barrier.

Thus, the normally-flammable cellular material is surrounded by an intumescent foam layer.

Treatment of cellular materials according to the present invention permits polyether-based urethane foams to be used in situations where there is a risk of exposure to heat and/or fire. Polyether-based urethane foams, when compared with polyester-based foams, show better dynamic properties (especially compression-set) and better hydrolytic properties, in addition to being less costly to produce.

The present invention will be illustrated by way of the following Examples.

EXAMPLE I

The ingredients shown in TABLE A (below) were mixed together.

TABLE A

| Notes (v.i.) | Ingredient | Amount (parts by weight) |
|---|---|---|
| (i) | Binder | 100 |
| (ii) | Polyisocyanate | 13 |
| (iii) | Intumescent component | 15 |
| (iv) | Polyhydric material | 7 |
| (v) | Catalyst | 0.1 |
| (vi) | Solvent | 100 |

Notes to TABLE A
(i) A polyester polyol (believed to be a partially branched diethylene glycol polyadipate) available from Witco Chemical Co. as FOMREZ 50. (FOMREZ is a Registered Trade Mark).
(ii) An undistilled grade of methylene-bis phenylisocyanate, available from I C I Limited as SUPRASEC DND. (SUPRASEC is a Registered Trade Mark).
(iii) An ammonium polyphosphate, available from Albright and Wilson Limited as AMGARD IU.
(iv) Soluble starch.
(v) Dibutyl tin dilaurate.
(vi) Ethyl acetate.

The mixture was sprayed on to the surface of a block of polyether-based urethane foam (Dunlopillo DI grade-available from Dunlop Limited) to give a surface covering of weight 500 g/m² and a penetration depth of about 3 mm.

On exposure of the treated foam to a "roaring" Bunsen flame (temperature about 900° C.) the foam surface intumesced and charred. On removal of the flame, after-burning of the foam extinguished in 2 to 3 seconds.

EXAMPLE II

The mixture described in Example I (above) was used to impregnate a block of 80:20 SBR/NR latex foam to a depth of 3 mm, giving a surface covering of weight 1169 g/m².

On exposure of the treated foam to a "roaring" Bunsen flame the foam surface intumesced and charred. On removal of the flame, after-burning of the foam extinguished in 5 to 6 seconds with the inner core of the foam smouldering slowly. An untreated sample burnt fiercely and completely.

EXAMPLE III

To a 10% solution of an isoprene-based thermoplastic rubber (available as CARIFLEX* TR-1107) in toluene there was added sufficient para-nitroaniline bisulphate to make a 1:2 dispersion. This dispersion was used to impregnate a block of polyether-based urethane foam (Dunlopillo DI) to give a surface covering of weight 614 g/m² and a penetration depth of 3 mm.
*CARIFLEX is a Registered Trade Mark.

On exposure of the treated foam to a "roaring" Bunsen flame the foam surface intumesced and charred. On removal of the flame, after-burning of the foam extinguished in 5 to 6 seconds.

EXAMPLE IV

A block of Dunlopillo D-10 flexible polyurethane foam, having dimensions of 15×15×4 inches and a density of 30 Kg/m³, was impregnated with a dispersion of an intumescent composition in a neoprene latex, the composition being made from the ingredients shown in TABLE B (below).

TABLE B

| Notes (v.i.) | Ingredient | Amount (parts by weight per 100 parts of foam) |
|---|---|---|
| (i) | Blowing agent | 7.7 |
| (ii) | Intumescent component | 25.0 |
| (iii) | Polyhydric material | 7.2 |
| (iv) | Anti-gel component | 29.7 |
| (v) | Binder | 8.0 |
|  | Water | 465.3 |

Notes to TABLE B
(i) Melamine
(ii) AMGARD IU (See Notes to TABLE A)
(iii) Pentaerythritol
(iv) A 5% aqueous solution of an ethylene oxide/oleyl alcohol copolymer, available from Vulnax International as VULCASTAB LW. (VULCASTAB is a Registered Trade Mark).
(v) A neoprene latex compound available from Dunlop Limited as LC 336.

The impregnated foam was placed in an oven at 110° C. in order to remove the water and cure the binder. The foam was removed from the oven when constant weight had been achieved.

On exposing a small sample of the impregnated foam to a roaring Bunsen flame it flamed initially and then formed a protective char approximately 3 mm thick and extinguished.

The block of foam was covered with a sheet of cotton which had been treated with a commercially-available flame-retardant material, believed to consist essentially of the reaction product of tetrakishydroxymethyl phosphonium chloride and ammonia, available from Albright and Wilson Ltd as PROBAN (Registered Trade Mark).

Two wooden cribs, each containing wood-wool in the centre was placed centrally on top of the cotton cover. Each crib was made up as follows:

| Type of wood | Pinus sylvestris |
|---|---|
| Stick length (mm) | 80 ± 2 |
| Stick square section (mm) | 12.5 ± 0.5 |
| Number of sticks | 10 |
| Total mass of sticks (g) | 63 ± 2 |
| Number of layers each of two sticks | 5 |
| Mass of wood-wool (g) | 3 ± 0.5 |

The sticks in each layer were placed as far away from each other as possible (but without any overhang) and glued together with a small amount of PVA adhesive. The ignition source was conditioned in an atmosphere having a temperature of 20°±2° C. and a relative humidity of 65%±5% for at least 16 hours before testing and the test undertaken within 1 hour after removal from the conditioning area.

When ignited the cribs burnt for 4½ minutes. All signs of flaming had ceased after 7 minutes and no smouldering was occurring. On examination the foam sample exhibited a crater some 8" in diameter and 2" in depth lined with a black char which had intumesced in patches.

Having now described my invention, what I claim is:
1. A cellular, intumescent material obtained by treating an open-celled substrate selected from the class consisting of polyether-based urethane foams, latex foams, natural rubbers and synthetic rubbers with a flexible, intumescable polymeric material, said flexible, intumescable polymeric material being one which, on exposure to a flame, melts, foams and solidifies to a foamed carbonaceous char, whereby said open-celled substrate becomes surrounded with an intumescent foam layer, said intumescable polymeric material comprising (A) a binder and (B) an intumescent component, said intumescent component (B) comprising a carbonific element different from said binder (A) and a spumific element.

2. The material of claim 1, wherein said substrate is a synthetic rubber selected from the class consisting of polybutadiene and styrene/butadiene rubbers.

3. The material of claim 1, wherein said binder (A) is a substance selected from the class consisting of polyesters, liquid polymer systems, resins, latices and solutions of thermoplastic elastomeric materials.

4. The material of claim 3, wherein said binder (A) is a substance selected from the class consisting of butadiene, styrene/butadiene copolymers and acrylonitrile/butadiene copolymers.

5. The material of claim 3, wherein said binder (A) is a substance selected from the class consisting of phenolic resins, urea/formaldehyde resins, resins based on polyvinyl chloride, alkyd resins and polyamide resins.

6. The material of claim 3, wherein said binder (A) is a substance selected from the class consisting of latices of neoprene, of styrene/butadiene rubber, of polyvinyl acetate, of polyvinyl chloride and of polyacrylonitrile.

7. The material of claim 1, wherein said carbonific element is a polyhydric material of high carbon content.

8. The material of claim 1, wherein said carbonific element is an aromatic compound capable of polymerisation to a "ladder" structure.

9. The material of claim 7, wherein said carbonific element is a substance selected from the class consisting of sorbitol, pentaerythritol and starch.

10. The material of claim 8, wherein said carbonific element is a substance selected from the class consisting or ortho- and para-nitroaniline.

11. The material of claim 1, wherein said spumific element is a substance selected from the class consisting of inorganic acids and substances capable of decomposition to yield inorganic acids.

12. The material of claim 11, wherein said spumific element is a substance selected from the class consisting of boric acid, phosphoric acid, sulphuric acid, ammonium halides, ammonium phosphates ammonium polyphosphates, melamine phosphate, urea phosphate and para-nitroaniline bisulphate.

13. A cellular, intumescent material consisting essentially of
(a) an open-celled substrate selected from the class consisting of polyether-based urethane foams, latex foams, natural rubbers and synthetic rubbers, and
(b) a flexible intumescable polymeric material, said flexible intumescable polymeric material being one which, on exposure to flame, melts, foams and solidifies to a foamed carbonaceous char, whereby said open-celled substrate becomes surrounded with an intumescent foam layer, said intumescable polymeric material comprising;
(A) a binder, and
(B) an intumescent component, said intumescent component (B) comprising:
  (i) a carbonific element different from said binder (A) and
  (ii) a spumific element; wherein said cellular intumescent material is obtained by treating said open-celled substrate with said flexible, intumescable polymeric material.

* * * * *